US012591259B2

(12) United States Patent
Tyrrell

(10) Patent No.: US 12,591,259 B2
(45) Date of Patent: Mar. 31, 2026

(54) DIGITAL LOW DROPOUT REGULATOR FOR GENERATING OUTPUT VOLTAGE DEPENDENT ON DAC CODE SIGNAL

(71) Applicant: Renesas Design (UK) Limited, Bourne End (GB)

(72) Inventor: Julian Tyrrell, Swindon (GB)

(73) Assignee: Renesas Design (UK) Limited, Bourne End (GB)

( * ) Notice: Subject to any disclaimer, the term of this patent is extended or adjusted under 35 U.S.C. 154(b) by 193 days.

(21) Appl. No.: 18/496,342

(22) Filed: Oct. 27, 2023

(65) Prior Publication Data

US 2025/0138561 A1 May 1, 2025

(51) Int. Cl.
*G05F 1/46* (2006.01)

(52) U.S. Cl.
CPC .................................... *G05F 1/468* (2013.01)

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/468; G05F 1/46; G05F 1/461; G05F 1/575; G05F 1/465; G05F 1/462; G05F 1/56; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 7,679,345 | B1 * | 3/2010 | Verma | G05F 1/575 323/273 |
| 9,817,416 | B2 * | 11/2017 | Gebeyehu | H03F 3/19 |
| 9,870,014 | B1 | 1/2018 | Ham et al. | |
| 9,979,410 | B2 * | 5/2018 | Wang | G05F 1/56 |
| 10,203,709 | B1 * | 2/2019 | Feng | G05F 1/468 |
| 10,216,209 | B1 | 2/2019 | Ham et al. | |

(Continued)

OTHER PUBLICATIONS

X. Mao, Y. Lu and R. P. Martins, "A 1.2-A Calibration-Free Hybrid LDO With In-Loop Quantization and Auxiliary Constant Current Control Achieving High Accuracy and Fast DVS," in IEEE Transactions on Circuits and Systems I: Regular Papers, vol. 69, No. 11, pp. 4443-4452, Nov. 2022, doi: 10.1109/TCSI.2022.3198268. 10 pages.

(Continued)

*Primary Examiner* — Crystal L Hammond
*Assistant Examiner* — Nusrat Quddus
(74) *Attorney, Agent, or Firm* — SCULLY, SCOTT, MURPHY & PRESSER, P.C.

(57) ABSTRACT

A digital low dropout regulator (LDO) for receiving a reference voltage and generating an output voltage, the digital LDO being synchronized to a clock signal and comprising a first digital to analog converter configured to generate a first DAC code signal, the output voltage being dependent the first DAC code signal, trigger state transitions of the first DAC code signal between states, and for at least a portion of the state transitions of the first DAC code signal, trigger each subsequent state transition after more clock cycles of the clock signal than for the preceding state transition.

17 Claims, 14 Drawing Sheets

(56) References Cited

U.S. PATENT DOCUMENTS

| | | | | |
|---|---|---|---|---|
| 10,845,831 | B2 * | 11/2020 | Liu | G05F 1/563 |
| 11,538,387 | B1 * | 12/2022 | Lee | G09G 3/20 |
| 12,326,748 | B2 * | 6/2025 | Tornila Oliver | G05F 1/575 |
| 2010/0164445 | A1 * | 7/2010 | Verma | G05F 1/575<br>323/281 |
| 2014/0266103 | A1 * | 9/2014 | Wang | G05F 1/565<br>323/275 |
| 2016/0282889 | A1 | 9/2016 | Mahajan et al. | |
| 2017/0269620 | A1 | 9/2017 | Duong et al. | |
| 2018/0292851 | A1 | 10/2018 | Mahajan et al. | |
| 2019/0064860 | A1 | 2/2019 | Cho et al. | |
| 2019/0204862 | A1 | 7/2019 | Feng et al. | |
| 2021/0165437 | A1 * | 6/2021 | Nasir | H02M 3/157 |
| 2022/0308611 | A1 | 9/2022 | Kim et al. | |
| 2022/0327209 | A1 * | 10/2022 | Schat | G09C 1/00 |
| 2022/0397926 | A1 * | 12/2022 | Bonomi | G05F 1/575 |

OTHER PUBLICATIONS

J. Liu and N. Maghari, “A fully-synthesizable 0.6V digital LDO with dual-loop control using digital standard cells,” 2016 14th IEEE International New Circuits and Systems Conference (NEWCAS), Vancouver, BC, Canada, 2016, pp. 1-4, doi: 10.1109/NEWCAS.2016.7604791. 4 pages.

US Ex Parte Quayle Action dated Oct. 1, 2025 issued in U.S. Appl. No. 18/496,218.

US Office Action dated Nov. 28, 2025 issued in U.S. Appl. No. 18/496,138.

* cited by examiner

800

DIGITAL LOW DROPOUT REGULATOR FOR GENERATING OUTPUT VOLTAGE DEPENDENT ON DAC CODE SIGNAL

The present disclosure relates to a digital low dropout regulator (LDO). In particular, the present disclosure relates to a digital LDO having an output voltage being dependent on a digital to analog converter (DAC) code signal.

BACKGROUND

FIG. 1A shows a digital LDO 100 as is known in the prior art (Jun Liu et. al., A Fully-Synthesizable 0.6V Digital LDO with Dual-Loop Control using Digital Standard Cells, 2016 14th IEEE International New Circuits and Systems Conference (NEWCAS), Vancouver, BC, Canada, 2016, pp. 1-4).

The LDO 100 comprises a main comparator 102; shift-registers 104, 106; a counter 108; a buffer 110; transistors 112, 114, 116, 118; panic circuitry 120 comprising comparators 122, 124 and a logic block 126; clock circuitry 128 comprising a multiplexer 130 and a frequency scaler 132; and a capacitor Co having equivalent series resistance (ESR) Ro.

The LDO 100 uses a coarse digital to analog converter (DAC) 134 and a fine DAC 136, each driven from an up-down counter 104, 106 and a clock control scheme 128 that times a response to a 'panic' detected by the window comparator provided by the panic circuitry 120.

The main control loop is the single comparator 102 (or 1-bit ADC) that compares a feedback voltage VFB, that is derived from an output voltage VLDO, with a target voltage VREF.

The operation of the up-down counters 104, 106 acts as an integration function to an error signal CMP, so that the stability of the loop depends on the zero of the external decoupling capacitor Co, which has an ESR denoted by Ro.

When a "panic" is detected, i.e., the output voltage VLDO has exceeded the range as defined by the window comparator 120, the coarse and fine up-down counters 104, 106 are clocked at the full clock speed CLK, and the output current is ramped towards the new target value (either up or down) under control of the main comparator output CMP.

As the output of the DACs 134, 136 are essentially current sources provided by the transistors 112, 114, 116, 118, the output voltage VLDO is the integral of this current, so there is a 90° phase shift of the control to the output voltage VLDO. Typically, this results is a limit cycle of the DAC codes. As the capacitor Co has some ESR (denoted by Ro) the amplitude of the limit cycling reduces to a steady state. However, the "panic" mode fast clocking is a timed period, which in this example is 32 clock cycles. When the "panic" fast clocking timeout ends, the fine loop 136 is left to operate at 1/32nd of the clock speed.

The coarse and fine DAC outputs are controlled using a current mirror scheme. This has two benefits:

1. It keeps the switching operation and the dynamics of the LDO consistent, and the performance as expected.
2. It reduced the PSRR sensitivity of the output stage.

FIG. 1B is a schematic of a current mirror scheme 138 for controlling course and fine DAC outputs, as is known in the prior art (Xiangyu Mao et. al., A 1.2-A Calibration-Free Hybrid LDO With In-Loop Quantization and Auxiliary Constant Current Control Achieving High Accuracy and Fast DVS, IEEE Transactions on Circuits and Systems-I: Regular Papers, Vol. 69, No. 11, November 2022).

The current mirror scheme 138 comprises transistors 140, current sources 142, a capacitor 144, an amplifier 146 and a sink buffer 148.

SUMMARY

It is desirable to provide a digital LDO that has reduced limit cycling when compared to known systems.

According to a first aspect of the disclosure there is provided a digital low dropout regulator (LDO) for receiving a reference voltage and generating an output voltage, the digital LDO being synchronized to a clock signal and comprising a first digital to analog converter configured to generate a first DAC code signal, the output voltage being dependent the first DAC code signal, trigger state transitions of the first DAC code signal between states, and for at least a portion of the state transitions of the first DAC code signal, trigger each subsequent state transition after more clock cycles of the clock signal than for the preceding state transition.

Optionally, the digital LDO comprises a clock circuit configured to generate the clock signal.

Optionally, the digital LDO comprises a comparison circuit configured to receive the reference voltage, receive a feedback voltage, the feedback voltage being dependent on the output voltage, compare the reference voltage and the feedback voltage, and generate an error signal that is dependent on the comparison between the reference voltage and the feedback voltage, wherein the first digital to analog converter is configured to receive the error signal, and generate the first DAC code signal based on the error signal.

Optionally, the comparison circuit comprises a main comparator or a 1-bit analog to digital converter.

Optionally, the first digital to analog converter comprises a first shift register configured to generate the first DAC code signal.

Optionally, the first shift register comprises an up-down counter.

Optionally, the first digital to analog converter comprises a plurality of first current sources, and each of the first current source functions as a bit of the first DAC code signal.

Optionally, each of the first current sources comprises a first transistor.

Optionally, the first shift register comprises a plurality of outputs, each output being associated with a single bit of the first DAC code signal and coupled to a gate of one of the plurality of first transistors.

Optionally, the first digital to analog converter comprises a plurality of first buffer circuits, each output being coupled to the gate of one of the plurality of first transistors via a buffer circuit.

Optionally, each of the first buffer circuits comprises a first inverter.

Optionally, the digital LDO comprises an output capacitor having an equivalent series resistance, the first DAC signal being provided to the output capacitor to generate the output voltage.

Optionally, the state transitions comprise rising transitions and falling transitions.

Optionally, the first digital to analog converter is configured to for at least a portion of the rising transitions of the first DAC code signal, trigger each subsequent rising transition after more clock cycles of the clock signal than for preceding rising transitions, and/or for at least a portion of the falling transitions of the first DAC code signal, trigger each subsequent falling transition after more clock cycles of the clock signal than for preceding falling transitions.

Optionally, the first digital to analog converter is configured to trigger a first rising transition after n clock cycles, where n is an integer, trigger a second rising transition after the first rising transition and after m clock cycles, where m is an integer and greater than n, trigger a first falling transition after p clock cycles, where p is an integer, and trigger a second falling transition after the first falling transition and after q clock cycles, where q is an integer and greater than p.

Optionally, n and p are equal and/or m and q are equal.

Optionally, the digital LDO comprises a second digital to analog converter configured to generate a second DAC code signal, the output voltage being dependent on the second DAC code signal.

Optionally, the first digital to analog converter is configured to provide fine control of the output voltage and the second digital to analog converter is configured to provide coarse control of the output voltage.

Optionally, the digital LDO comprises a comparison circuit configured to receive the reference voltage, receive a feedback voltage, the feedback voltage being dependent on the output voltage, compare the reference voltage and the feedback voltage, and generate an error signal that is dependent on the comparison between the reference voltage and the feedback voltage, wherein the first digital to analog converter is configured to receive the error signal, and generate the first DAC code signal based on the error signal, and the second digital to analog converter is configured to receive the error signal, and generate the second DAC code signal based on the error signal.

Optionally, the second digital to analog converter comprises a second shift register configured to generate the second DAC code signal.

Optionally, the second shift register comprises an up-down counter.

Optionally, the second digital to analog converter comprises a plurality of second current sources, wherein each of the second current sources functions as a bit of the second DAC code signal.

Optionally, each of the second current sources comprises a second transistor.

Optionally, the second shift register comprises a plurality of outputs, each output being associated with a single bit of the second DAC code signal and coupled to a gate of one of the plurality of second current sources.

Optionally, the second digital to analog converter comprises a plurality of second buffer circuits, each output being coupled to the gate of one of the plurality of second current sources via a buffer circuit.

Optionally, each of the second buffer circuits comprises a second inverter.

Optionally, the digital LDO comprises an output capacitor having an equivalent series resistance, the first and second DAC signals being provided to the output capacitor to generate the output voltage.

Optionally, the digital LDO comprises a clock circuit configured to generate the clock signal.

Optionally, the digital LDO comprises a panic circuit configured to detect when the feedback voltage exceeds a first threshold voltage value or falls below a second threshold voltage value, and control the first digital to analog converter to operate in a panic mode when the feedback voltage exceeds the first threshold voltage value or falls below the second threshold voltage value, wherein the clock circuit is configured to provide the clock signal to the comparison circuit, operate in a fast mode during the panic mode by providing the clock signal at a first frequency, and operate in a slow mode, when not in the panic mode, by providing the clock signal at a second frequency, the second frequency being less than the first frequency.

Optionally, the panic circuit is configured to output a panic signal in response to the detection of the feedback voltage exceed the first threshold value or falling below the second threshold value, the panic signal being used to switch the first digital to analog converter to the panic mode.

Optionally, the panic circuit comprises a first comparator configured to compare the feedback voltage with the first threshold value and a second comparator configured to compare the feedback voltage with the second threshold value.

Optionally, the panic circuit comprises a logic circuit configured to receive outputs of the first and second comparators and to provide the panic signal in response to the first and second comparator outputs indicating that the feedback voltage has exceeded the first threshold value or has fallen below the second threshold value.

Optionally, the digital LDO comprises a counter circuit configured to receive the panic signal and the error signal, wherein the first digital to analog converter comprises a first shift register configured to generate the first DAC code signal, and the counter circuit is further configured to increment the first shift register whilst the first digital to analog converter is operating in the panic mode.

Optionally, the digital LDO comprises a counter circuit configured to receive the panic signal and the error signal, wherein the first digital to analog converter comprises a first shift register configured to generate the first DAC code signal, the second digital to analog converter comprises a second shift register configured to generate the second DAC code signal, and the counter circuit is further configured to increment the first and second shift registers.

Optionally, the clock circuit comprises a multiplexer for receiving an input clock signal and a frequency scaling unit, the clock circuit is configured to provide the input clock signal as the clock signal during the fast mode, and the frequency scaling unit is configured to reduce the frequency of the input clock signal in the generation of the clock signal during the slow mode.

According to a second aspect of the disclosure there is provided a method of generating an output voltage using a digital LDO comprising a first digital to analog converter and synchronized to a clock signal comprising receiving a reference voltage at the digital LDO, generating a first DAC code signal using the first digital to analog converter, triggering state transitions of the first DAC code signal between states using the first digital to analog converter, and for at least a portion of the state transitions of the first DAC code signal, triggering each subsequent state transition after more clock cycles of the clock signal than for the preceding state transition, using the first digital to analog converter, and generating the output voltage, the output voltage being dependent on the first DAC code signal.

It will be appreciated that the method of the second aspect may include features set out in the first aspect and can incorporate other features as described herein.

BRIEF DESCRIPTION OF THE DRAWINGS

The disclosure is described in further detail below by way of example and with reference to the accompanying drawings, in which.

DETAILED DESCRIPTION

Figure 2A:
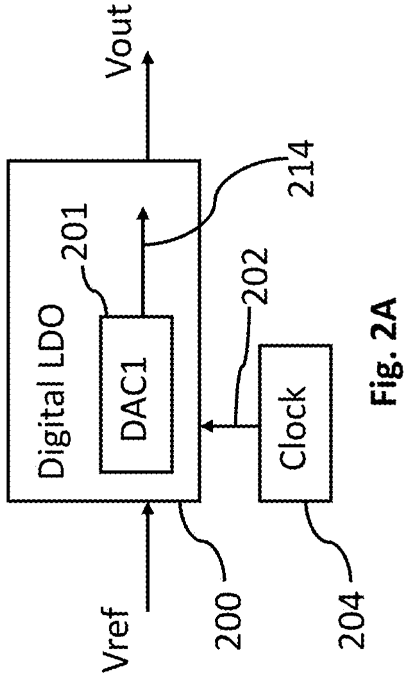
FIG. 2A is a schematic of a digital low dropout regulator (LDO) in accordance with a first embodiment of the present disclosure.

FIG. 2A is a schematic of a digital low dropout regulator (LDO) 200 for receiving a reference voltage Vref and generating an output voltage Vout, in accordance with a first embodiment of the present disclosure.

Operation of the digital LDO 200 is synchronised to a clock signal 202 as may be received from a clock circuit 204. In the present example, the clock circuit 204 is external to the LDO 200. However, in further embodiments, the LDO 200 may comprise the clock circuit 204.

The role of the clock signal 202 will be well known to the skilled person. The clock signal 202 is a signal that periodically varies, with the actions of the digital LDO 200 being synchronised to a periodic variation of the clock signal 202.

The clock signal 202 may vary periodically between high and low states, with a duty cycle of, for example, 50%. Operation of components within the LDO 200 may be triggered by the detection of a rising edge and/or a falling edge of the clock signal 202.

Figure 2B:
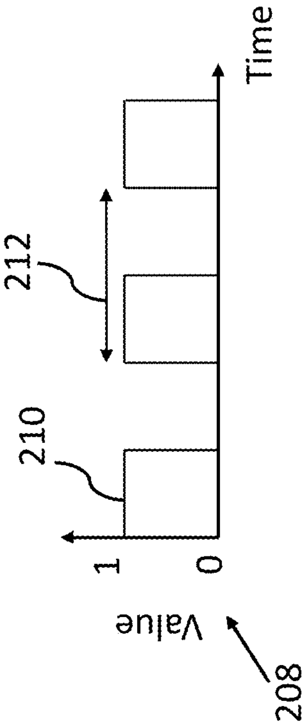
FIG. 2B is a timing graph showing an example of the clock signal as it varies with time.

FIG. 2B is a timing graph 208 showing an example of the clock signal 202 (a trace 210) as it varies with time. In the present example, the clock signal 202 varies between low and high states, and has a duty cycle of 50%. A single period of the clock signal may be referred to as a clock cycle. A single cycle of the clock is labelled by reference numeral 212.

The LDO 200 comprises a digital to analog converter (DAC) 201 that generates a DAC code signal 214 during operation of the LDO 200. The output voltage Vout is dependent the DAC code signal 214.

Figure 2C:
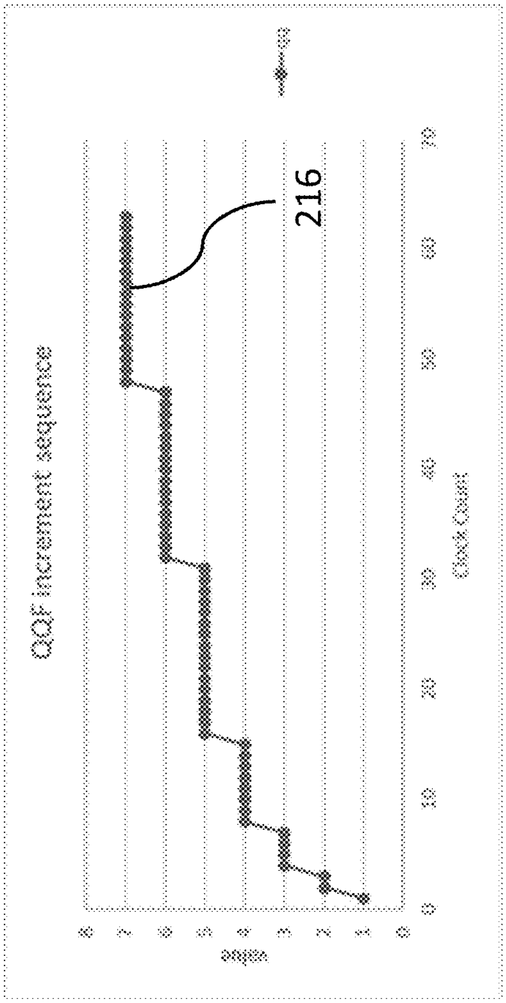
FIG. 2C is a graph showing an example of the DAC code signal as it transitions between states in response to varying numbers of clock cycles.

FIG. 2C is a graph showing an example of the DAC code signal 214 (a trace 216) as it transitions between states in response to varying numbers of clock cycles. In operation, the DAC 201 triggers state transitions of the DAC code signal 214 from one state to the next. For example, and with reference to FIG. 2C, there is shown a transition from a first state (having value "1" on the y-axis) to a second state (having value "2" on the y-axis), and then further transitions up to the seventh state (having value "7" on the y-axis).

The DAC 201 is configured to, for at least a portion of the state transitions of the DAC code signal 214, trigger each subsequent state transition after more clock cycles of the clock signal 202 than for the preceding state transition.

For example, and with reference to FIG. 2C where the x-axis denotes clock counts which refers to the number of clock cycles, it can be observed that the transition from the first state to the second state occurs after 1 clock cycle, whilst the transition from the second state to the third state occurs after 2 clock cycles. This progresses as follows:

From the third state to the fourth state after 4 clock cycles

From the fourth state to the fifth state after 8 clock cycles

Then each subsequent transition occurs after 16 clock cycles. FIG. 2C shows rising transitions. It will be appreciated that in further embodiments, the DAC code signal 214 may undergo falling transitions, or both rising and fallings transitions.

Figure 2D:
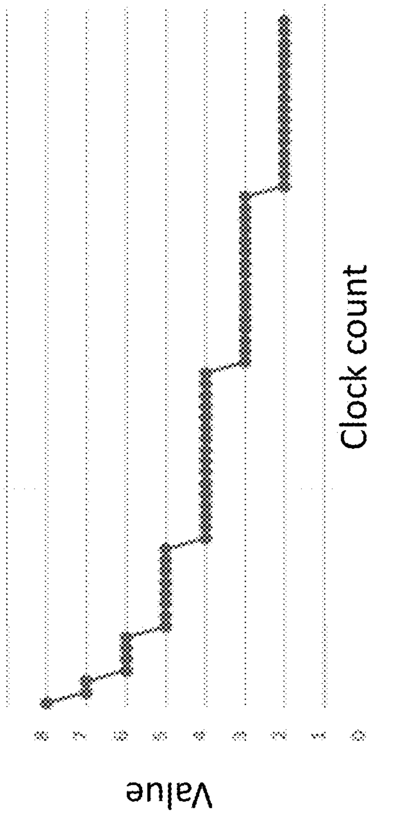
FIG. 2D is a graph showing an example of the DAC code signal as it undergoes falling transitions.
Figure 2E:
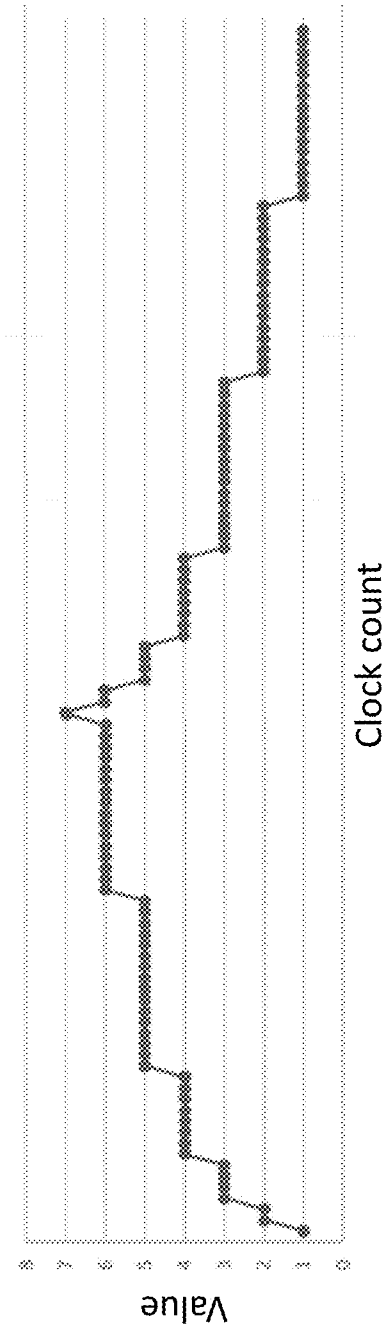
FIG. 2E is a graph showing an example of the DAC code signal as it undergoes rising transitions followed by falling transitions.

FIG. 2D is a graph showing an example of the DAC code signal 214 (a trace 218) as it undergoes falling transitions. FIG. 2E is a graph showing an example of the DAC code signal 214 (a trace 220) as it undergoes rising transitions followed by falling transitions. With reference to FIG. 2E it can be observed that when the DAC code signal 214 changes from falling to rising, the number of clock cycles required to trigger a transition effectively "resets" with the sequence of required clock cycles repeating. It will be appreciated that this may also occur as the DAC code signal 214 changes from rising to falling.

It will be appreciated that in further examples, there may be different numbers of clock cycles used for the triggering of transitions. For example, the DAC 201 may be configured to trigger a first rising transition after n clock cycles, where n is an integer. A second rising transition, occurring after the first, may be triggered after m clock cycles, where m is also an integer and greater than n. There may then be a first falling transition after p clock cycles, where p is an integer, followed by a second falling transition after q clock cycles, where q is an integer that is greater than p. It will be appreciated that n and p may be equal and/or m and q may be equal.

Figure 3A:
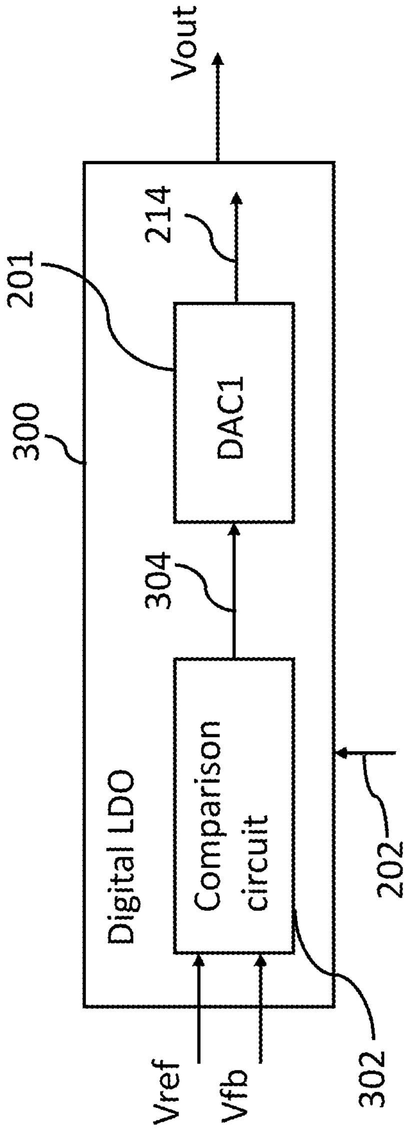
FIG. 3A is a schematic of a digital LDO in accordance with a second embodiment of the present disclosure.

FIG. 3A is a schematic of a digital LDO 300 in accordance with a second embodiment of the present disclosure. The LDO 300 comprises a comparison circuit 302 configured to receive the reference voltage Vref and the feedback voltage Vfb. The feedback voltage is dependent on the output voltage Vout.

In a specific embodiment the feedback voltage Vfb may be the output voltage Vout, with the output voltage Vout being coupled to an input terminal of the comparison circuit 302.

In a further specific embodiment the feedback voltage Vfb may be generated from the output voltage Vout such that the feedback voltage Vfb is responsive to changes in the output voltage Vout. For example, the feedback voltage Vfb may be generated by providing the output voltage Vout to a potential divider, with an output of the potential divider being coupled to the input terminal of the comparison circuit 302. In such an example, the feedback voltage Vfb is then a fraction of the output voltage Vout, which may be necessary to reduce the voltage provided to the comparison circuit 302 to a suitable level for operation.

In operation, the comparison circuit 302 compares the voltages Vfb, Vref, and generates an error signal 304 that is dependent on the outcome of the comparison. In a specific embodiment, the comparison, for example, may be a subtraction of the reference voltage Vref from the Vfb such that the error signal 304 is equal to the feedback voltage Vfb minus the reference voltage Vref.

During operation of the LDO 300, the DAC 201 receives the error signal 304 and generates the DAC code signal 214 based on the error signal 304.

The comparison circuit 302 may comprise a main comparator or a 1-bit analog to digital converter (ADC).

Figure 3B:
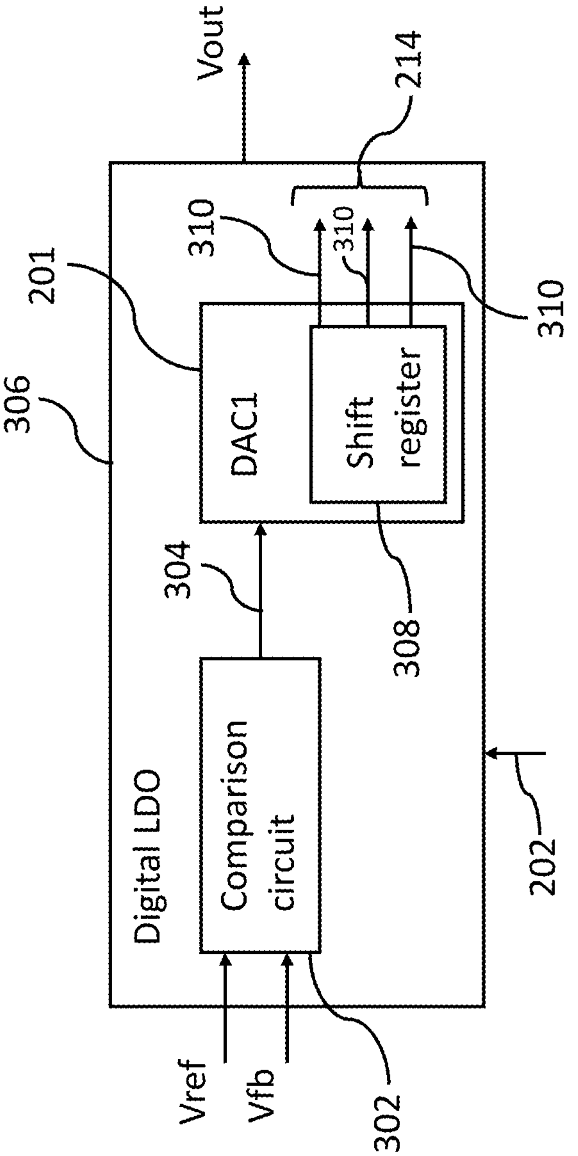
FIG. 3B is a schematic of a digital LDO, in accordance with a third embodiment of the present disclosure.

FIG. 3B is a schematic of a digital LDO 306, in accordance with a third embodiment of the present disclosure. In the present embodiment, the DAC 201 comprises a shift register 308 that is configured to generate the DAC code signal 214.

A shift register is a digital circuit that incrementally shifts data from one storage location to another. The shift register 308 may comprise an up-down counter that may, for example, be used to incrementally count up or down, with the output of the shift register 308 being indicative of the presently stored value that increases or decreases incrementally during operation.

In the present embodiment, the shift register 308 provides a plurality of outputs 310, with each output having a binary value during operation and collectively forming the DAC code signal 214.

Figure 3C:
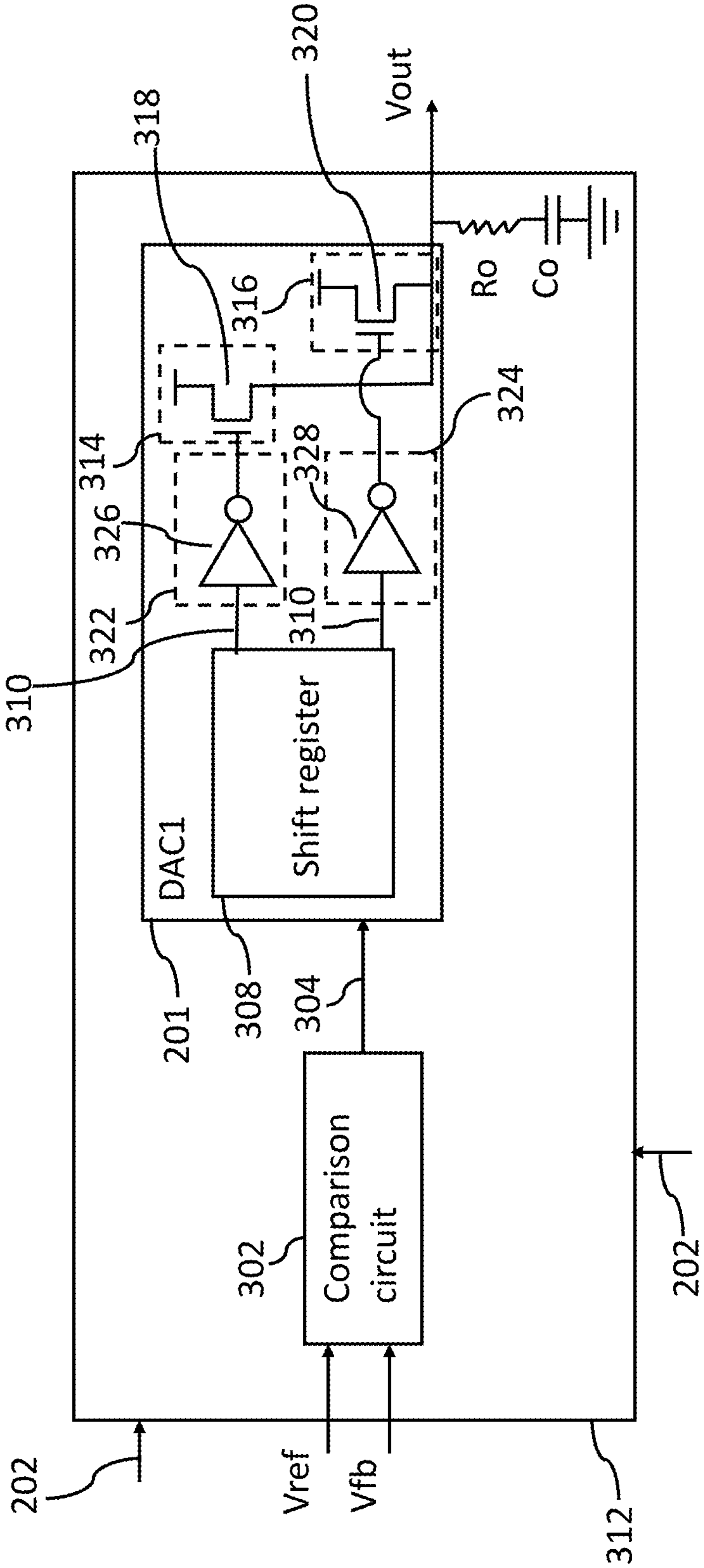
FIG. 3C is a schematic of an LDO in accordance with a fourth embodiment of the present disclosure.

FIG. 3C is a schematic of an LDO 312 in accordance with a fourth embodiment of the present disclosure. The DAC 201 comprises current sources 314, 316 with each of the current sources 318, 320 functioning as a bit of the DAC code signal 214. In the present embodiment there is illustrated two current sources 314, 316. However, it will be appreciated that in further embodiments, the DAC 201 may comprise more than two current sources, with each current source functioning as a bit of the DAC code signal 214. Each of the current sources 314, 316 may comprise a transistor. In the present embodiment, the current source 314 comprises a transistor 318 and the current source 316 comprises a transistor 320.

Each of the outputs 310 is associated with a single bit of the DAC code signal 214 and is coupled to a gate of one of the transistors 318, 320.

The DAC 201 comprises buffer circuits 322, 324, with each of the outputs 310 being coupled to a gate via one of the buffer circuits 322, 324. The buffer circuits 322, 324 may each comprise an inverter. In the present embodiment, the buffer circuit 322 comprises an inverter 326 and the buffer circuit 324 comprises an inverter 328.

The LDO 312 may comprise an output capacitor Co having an equivalent series resistance (ESR) Ro, with the DAC signal 214 being provided to the output capacitor Co to generate the output voltage Vout. It should be noted that the resistor symbol denoted by Ro is an ESR of the capacitor Co and is therefore not a physical component that is separately implemented within the circuit.

Figure 4B:
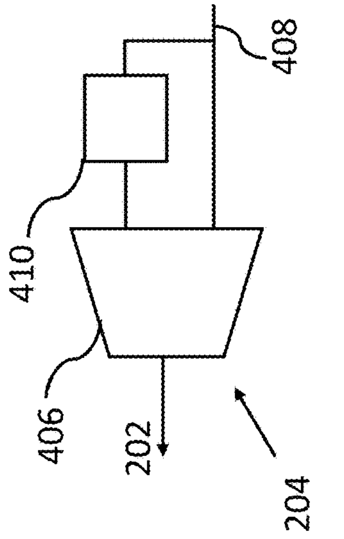
FIG. 4B is a schematic of an example specific implementation of the clock circuit.
Figure 4A:
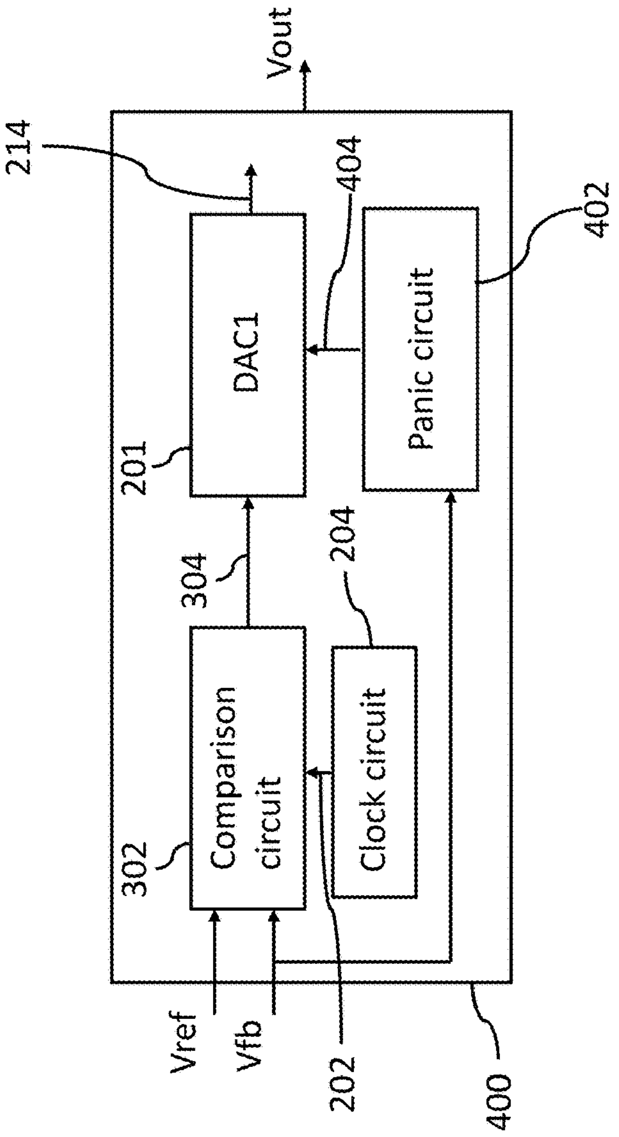
FIG. 4A is a schematic of a digital LDO in accordance with a fifth embodiment of the present disclosure.

FIG. 4A is a schematic of a digital LDO 400 in accordance with a fifth embodiment of the present disclosure. The LDO 400 comprises a panic circuit 402 that is configured to detect when the feedback voltage Vfb exceeds a first threshold voltage value or falls below a second threshold voltage value. In response to the feedback voltage Vfb moving outside of the range enclosed by the threshold values, the panic circuit 402 controls the DAC 201 to operate in a panic mode.

The clock circuit 204 provides the clock signal 202 to the comparison circuit 302. The clock circuit 204 operates in a fast mode during the panic mode by providing the clock signal 202 at a first frequency and operates in a slow mode, when not in the panic mode, by providing the clock signal 202 at a second frequency. The frequency of the clock signal 202 during the slow mode is smaller than the frequency during the fast mode.

The panic circuit 402 may output a panic signal 404 in response to the feedback voltage Vfb moving outside of the range enclosed by the threshold values, with the panic signal 404 being used to switch the DAC 201 to the panic mode.

FIG. 4B is a schematic of an example specific implementation of the clock circuit 204. The clock circuit 204 comprises a multiplexer 406 for receiving an input clock signal 408 and a frequency scaling unit 410. The clock circuit 204 is configured to provide the input clock signal 408 as the clock signal 202 during the fast mode, and the frequency scaling unit 410 is configured to reduce the frequency of the input clock signal 408 in the generation of the clock signal 202 during the slow mode.

Figure 4C:
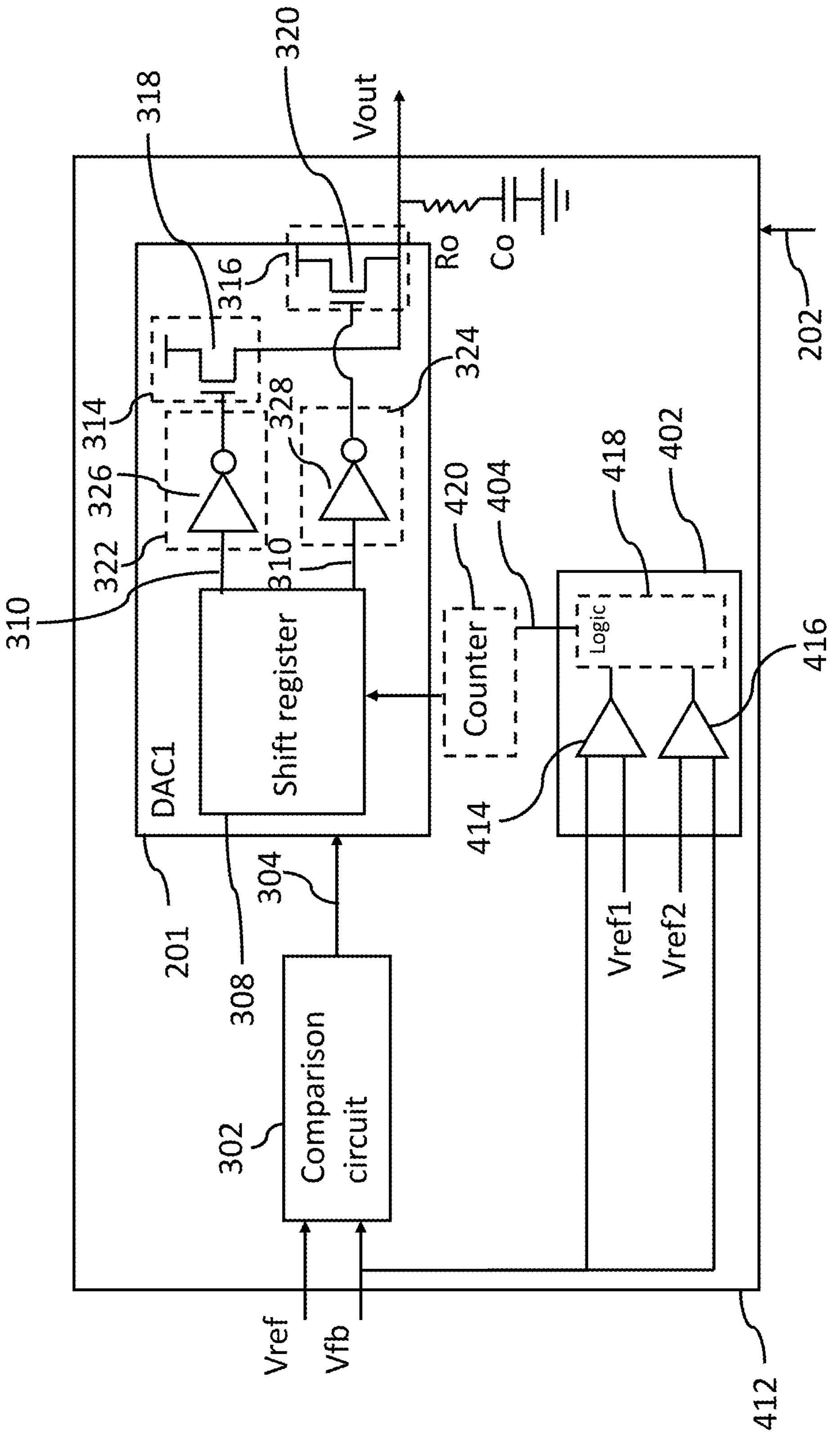
FIG. 4C is a schematic of a digital LDO in accordance with a sixth embodiment of the present disclosure.

FIG. 4C is a schematic of a digital LDO 412 in accordance with a sixth embodiment of the present disclosure.

In the present embodiment, the panic circuit 402 comprises two comparators 414, 416. The comparator 414 receives the feedback voltage Vfb and compares the feedback voltage Vfb to a first threshold value (as provided by the reference voltage Vref1). The comparator 416 receives the feedback voltage Vfb and compares the feedback voltage Vfb to a second threshold value (as provided by the reference voltage Vref2).

The panic circuit 402 may further comprises a logic circuit 418 that is configured to receive outputs of the comparators 414, 416 and to provide the panic signal 404 in response to the comparator outputs indicating that the feedback voltage Vfb has moved outside the voltage range enclosed by the threshold values provided by Vref1 and Vref2.

The LDO 412 may further comprise a counter circuit 420 that is configured to receive the panic signal 404. The counter circuit 412 may also receive the error signal 304. During operation, the counter circuit 420 is configured to increment the shift register 308.

For example, when the comparators 414, 416 detect that the feedback voltage Vfb is outside the operating window defined by the threshold values provided by Vref1, Vref2, the logic circuit 418 responds by providing the panic signal 404 the counter circuit 412. The feedback voltage Vfb may move outside the operating window, for example, when a load transient occurs that results in an unwanted variation in the output voltage Vout. The counter circuit 412 then increments the shift register 308 to increment the DAC code signal 214 to restore the output voltage Vout to its intended value as defined by the reference voltage Vref.

Figure 1B:
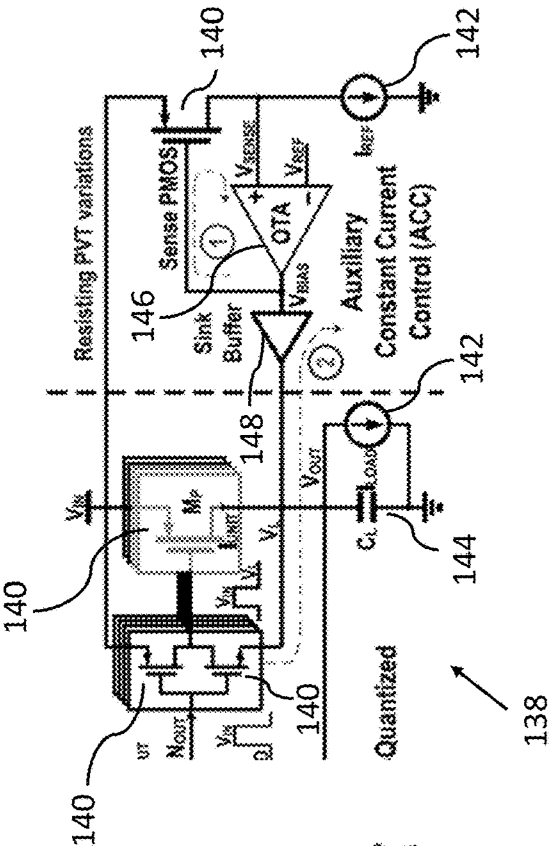
Fig. 1B (Prior Art)
FIG. 1B is a schematic of a current mirror scheme for controlling course and fine DAC outputs, as is known in the prior art.
Figure 1A:
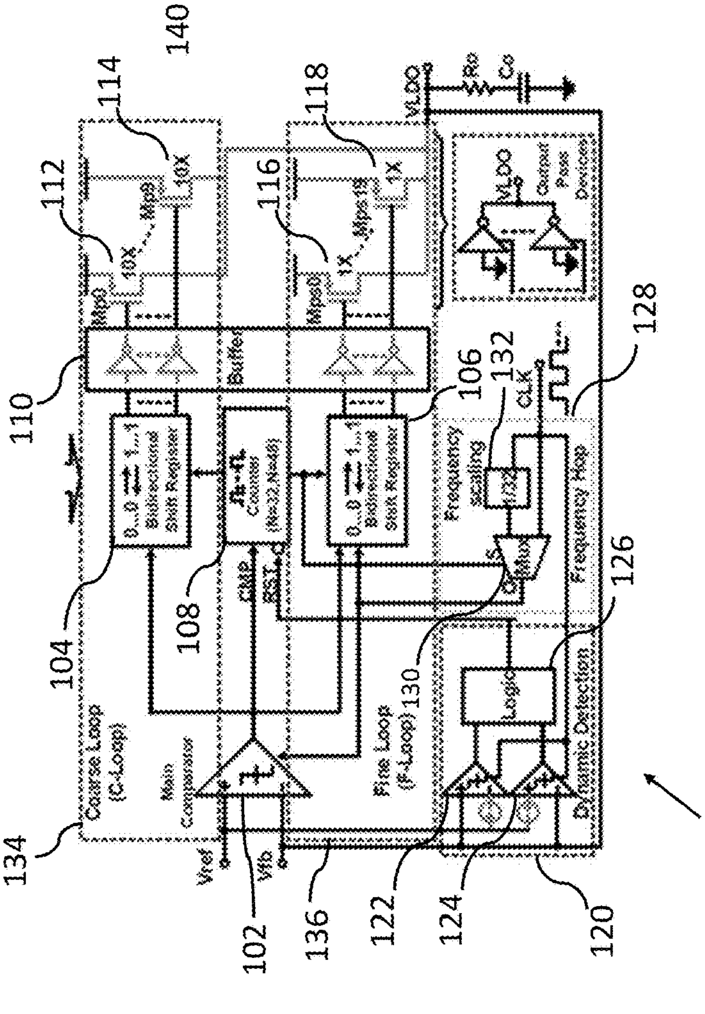
Fig. 1A (Prior Art)
FIG. 1A shows a digital LDO 100 as is known in the prior art.
Figure 5A:
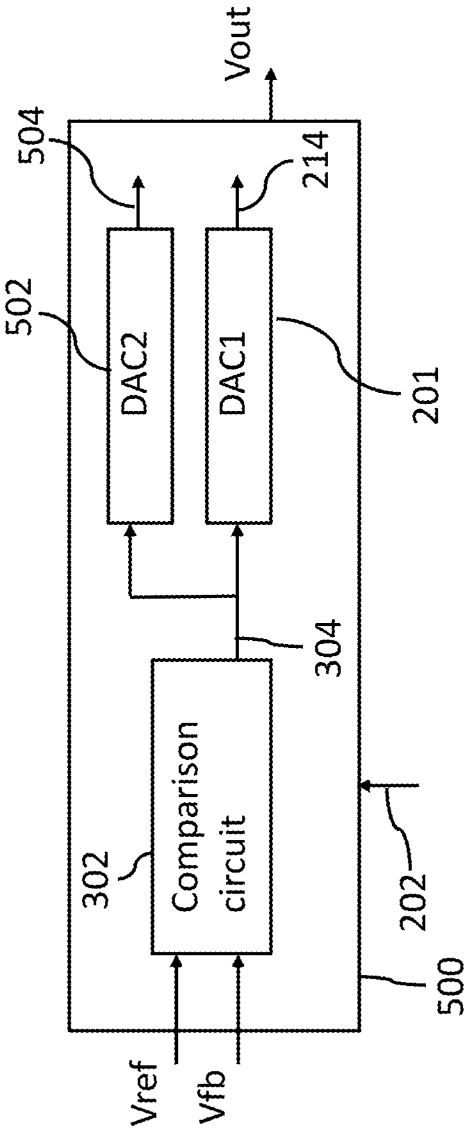
FIG. 5A is a schematic of a digital LDO in accordance with a seventh embodiment of the present disclosure.

FIG. 5A is a schematic of a digital LDO 500 in accordance with a seventh embodiment of the present disclosure. In the present embodiment, the LDO 500 comprises a DAC 502 that is configured to generate a DAC code signal 504, with the output voltage Vout being dependent on both DAC code signals 214, 504. In a specific embodiment, the DAC 201 may provide fine control of the output voltage Vout, for example as provided by the DAC 136 of FIG. 1A, with the DAC 502 providing coarse control of the output voltage Vout, for example as provided by the DAC 134 of FIG. 1A.

Figure 5B:
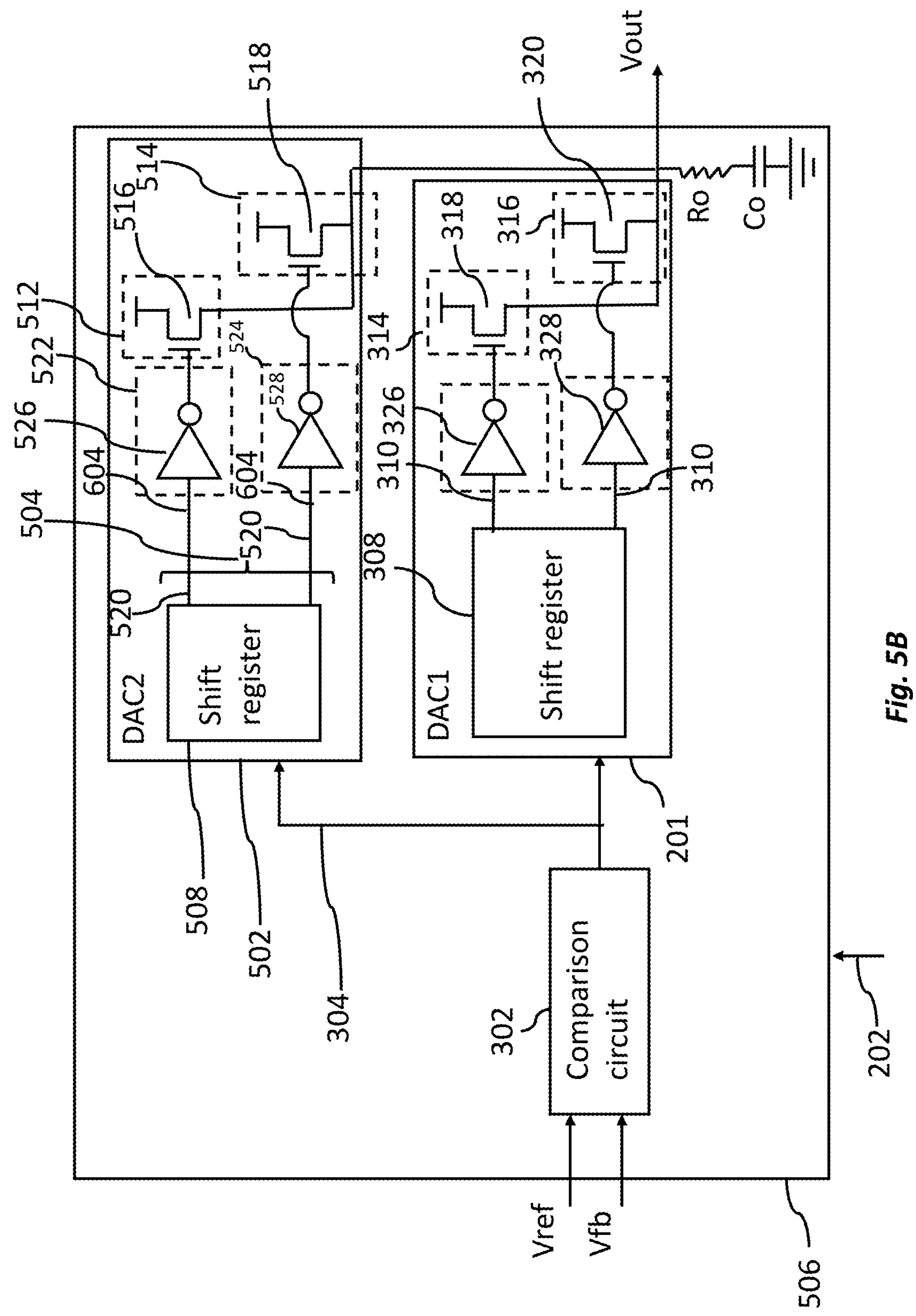
FIG. 5B is a schematic of a digital LDO in accordance with an eighth embodiment of the present disclosure.

FIG. 5B is a schematic of a digital LDO 506 in accordance with an eighth embodiment of the present disclosure. In the present embodiment. In the present example, the DAC 502 comprises a shift register 508 for generating the DAC code signal 504. The shift register 508 may comprise an up-down counter. The DAC 502 may comprise a plurality of current sources, with two current sources 512, 514 being provided in the current embodiment. The current sources 512, 514 each function as a bit of the DAC code signal 504. Each of the current sources 512, 514 comprises a transistor 516, 518.

The shift register 508 may comprise a plurality of outputs 520, each output being associated with a single bit of the DAC code signal 504 and coupled to a gate of one of the plurality of current sources 516, 518.

The DAC 502 may comprise a plurality of buffer circuits 522, 524 with each output 520 being coupled to the gate of one of the second current sources 516, 518 via one of the buffer circuits 522, 524. Each of the buffer circuits 522, 524 may comprise an inverter 526, 528.

In the present embodiment, the DAC code signals 214, 504 are both provided to the output capacitor Co to generate the output voltage Vout.

Figure 6:
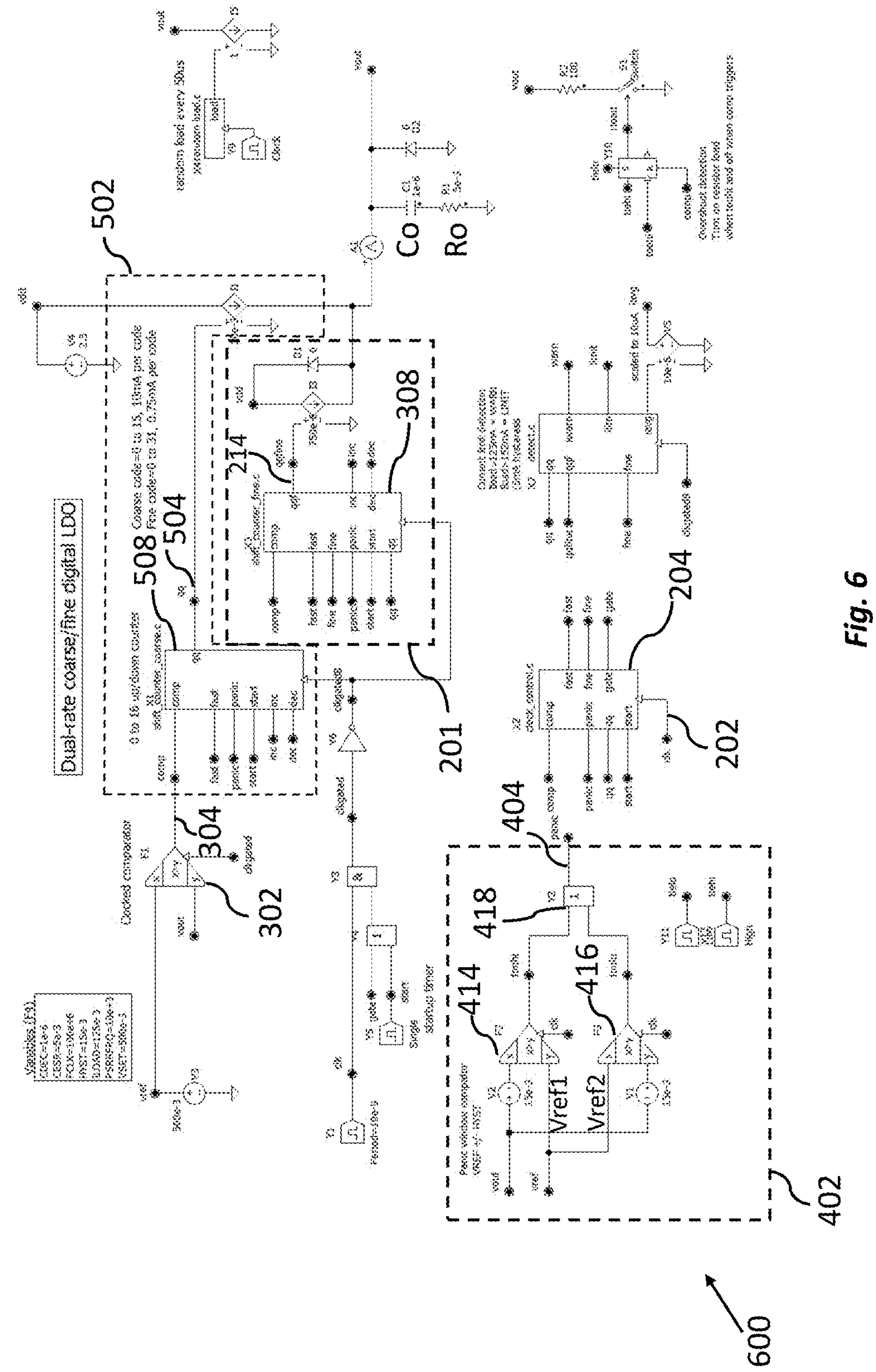
FIG. 6 is a schematic of a digital LDO in accordance with a ninth embodiment of the present disclosure.

FIG. 6 is a schematic of a digital LDO 600 in accordance with a ninth embodiment of the present disclosure. The digital LDO 600 comprises the following components:

- Clocked comparator (relating to the comparison circuit 302, as described previously). During operation, the clocked comparator 302 compares the target 'vref' voltage (previously labelled Vref) with the output 'vout' voltage (previously labelled Vout) and produces a 'comp' signal (previously referred to as the error signal 304) that is used by the coarse up-down counter (relating to a specific embodiment of the shift register 508) and the fine up-down counters (relating to a specific embodiment of the shift register 308).
- Panic comparators (relating to the specific implementation of the panic circuit 402). These form a window comparator and provides an output that is indicative of whether the output voltage vout is too high 'toohi' or too low 'toolo'. These are used to form the 'panic'.
- Shift_counter_coarse (previously described in relation to the shift register 508). In the present embodiment, this is a 4-bit up-down counter that controls the large coarse stepped DAC 508. In the current embodiment, each bit 512, 514 of the DAC 502 is a 10 mA current source, i.e. 0 to 150 mA output.
- Shift_counter_fine (previously described in relation to the shift register 308). In the present embodiment, this is a 5-bit up-down counter that controls the small fine stepped DAC 201. Each bit 314, 316 of the DAC 201 is a 750 μA current source, i.e. 0 to 23.23 mA output. The fine DAC 201 is scaled to be approximately 2.2 times larger than the coarse step. When the up-down counter 308 reaches the limit (31 or 0) it indicates an increment ('inc') or decrement ('dec') to the coarse counter 508 so that it remains within its controllable region. For example, when the upper limit of 31 is hit, an increment of the coarse DAC 502 adds 10 mA, so the fine DAC 201 subtracts the nearest of 9.25 mA, or 12 codes, so that the next output current increases by 1 fine DAC 201 step of 0.75 mA. This allows the control loop to accommodate slowly changing loads without triggering a 'panic'.
- Clock_control (previously described in relation to the clock circuit 204). In the present embodiment, the clock circuit 204 controls the duration of the panic mode signals ('fast' and 'fine') and divides the system clock for the slower fine control mode, by gating the clock every 16 cycles ('gate'), so the 'fine' mode runs at 1/16th of the clock speed.
- Detect. This is a telemetry block that warns and indicates when the output current is reaching its maximum ('warn' and 'limit') using the coarse and fine DAC codes ('qq' and 'qqfine'). There is also a measurement of the output current, using a IIR filter and the DAC codes.
- Overshoot detection. This is a RS latch triggered pull-down resistor, used when the VOUT is above the 'tooHi' threshold. If the load current drops (say to zero) this is the active mechanism to discharge the output capacitor Co. In a further embodiment, it can also be used to discharge the output when the LDO is turned off.

The LDO 600, and other embodiments described herein, use progressive time elongation of DAC steps to reduce limit cycling. In the present embodiment, the progressive time elongation is applied to the DAC code signal 214 that is generated by the "fine" mode DAC. The graph shown in FIG. 2C shows how the DAC code signal 214 varies in the present example.

When the LDO 600 is operating in the "fine" mode the shift register 308 generates the DAC code signal 214 by incrementally counting from one state to the next. This count is between 0 and 31 and increments when 'comp' (the error signal 304) is high and decrements when 'comp' (the error signal 304) is low.

The technique to reduce the limit cycle ripple of the count, and consequently the output voltage Vout, is to implement a form of PID (proportional, integral, differential) controller.

For the digital LDO 600 the differential and integral terms are used—the integral as the structure is an up/down counter, provided by the shift register 308.

The differential term is implemented by changing the time that the up/down counter increments. On either transition edge of the comparator 302 signal 'comp' the up/down counter time sequence is reset. In the present example, the count is reset to 1 on every comparator transition edge.

The following sequence is the number of clock counts that pass for the next increment/decrement of the counter can occur (this is the 'targinc' value):

1, 2, 4, 8, 16, 16, 16, 16, 16, 16, . . .

This sequence is illustrated in FIG. 2C where there is shown an example of the counter 308 incrementing, with the value plotted against clock counts, starting at a 'comp' edge.

In the present embodiment there is sequential doubling of the "slow" clock count per fine DAC step, whilst the comparator 302 remains at a constant logic level. This leads to reduced limit cycling of the DAC output and sequential steps take longer periods. The maximum doubling count is limited to a predefined ceiling—in this case, 16.

The present embodiment can provide a reduction of the limit cycling of the fine DAC in steady-state loading.

Fitting an equation to this QQF increment curve results in:

$$QQF = 1.5544\ln(\text{Count}) + 0.3896 \quad (1)$$

The rate of change of this is given by the differential of this function:

$$\frac{dQQF}{dCount} = \frac{1.5544}{\text{Count}} \quad (2)$$

Figure 7:
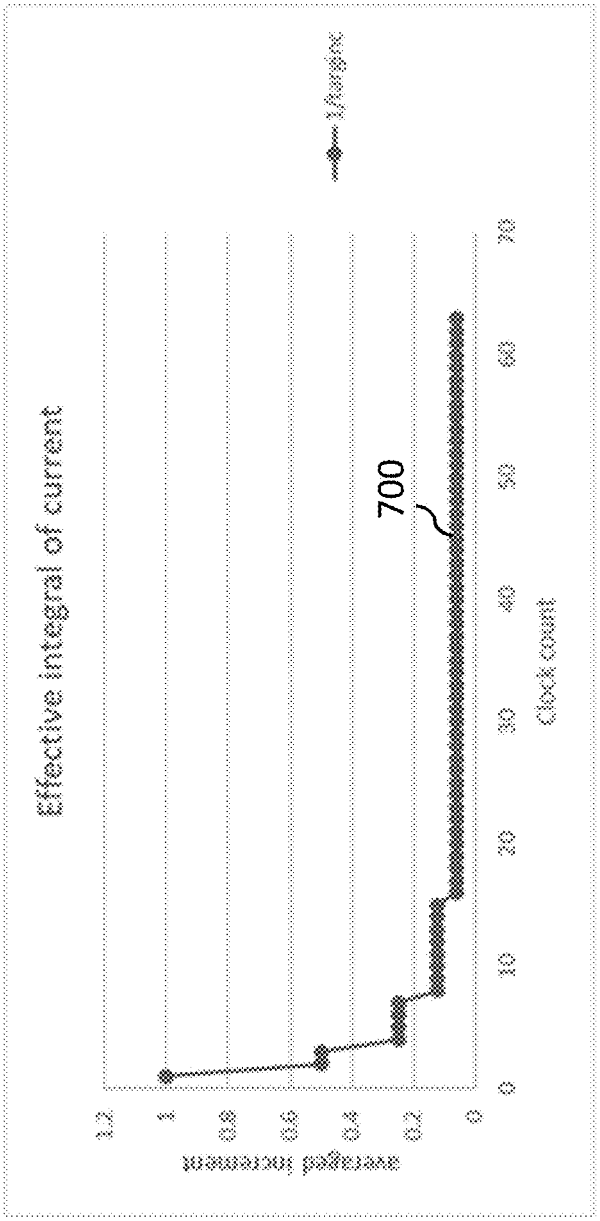
FIG. 7 is a graph of the reciprocal of the "targinc" value which shows the differential of the increase in the output voltage Vout (which is the integral of the selected current)

FIG. 7 is a graph of the reciprocal of the "targinc" (a trace 700) value which shows the differential of the increase in the output voltage Vout (which is the integral of the selected current).

The output current Iout of the LDO 600 may be represented as follows:

$$Iout = QQF \times \frac{\text{current}}{\text{bit}} \quad (3)$$

This shows the differential component of the up/down count triggered by a 'comp' edge transition. This shows the rate of increase in the output voltage Vout slows down over time.

current/bit in equation (3) indicates the "current per bit", and may be referred to as the DAC current step. In a specific implementation the fine DAC current step may be 750 uA, and QQF is the DAC code. For example, if the QQF=6 then the Iout=6*750 u=4.5 mA.

Figure 8:
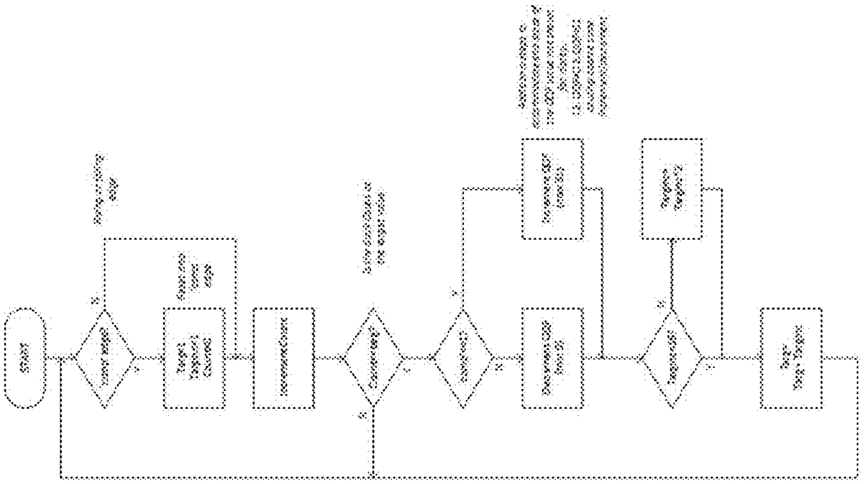
FIG. 8 is a flow chart showing the operation of the LDO.

FIG. 8 is a flow chart 800 showing the operation of the LDO 600, and in particular in relation to the generation of QQF, which is the DAC code signal 214.

The operation of the LDO 600 may be described by the following C code:

```
main( )
{
  //shift register to find edges
  compold = compnew;
  compnew = ishigh(comp);
  //find edge and count width, hold in reset whist FAST
  if((compnew ^ compold) || ishigh(fast))
  {
    count=1;
    targ=1;
    targinc=1;
  }
  else
  {
    //non-wrapping count (for long periods of COMP=0 with no load)
    if(count<511) count +=1;
  }
  //if panic, set to 32 or 0
  //else if comp==1 increment, else decrement
  //no wrapping
  if(ishigh(panic))
  {
    if(compnew)
      qqf=qqflim;
    else
      qqf=0;
  }
  else
  {
//output qqf, bound checked
  qqf = limit(qqf,0,qqflim);
  //output inc/dec signals, 1 clock wide
```

-continued

```
//if coarse is not at ends
if(qqf==31 && qq<15)
  inc=5;
else
  inc=0;
if(qqf==0 && qq>0)
```

Figure 9:
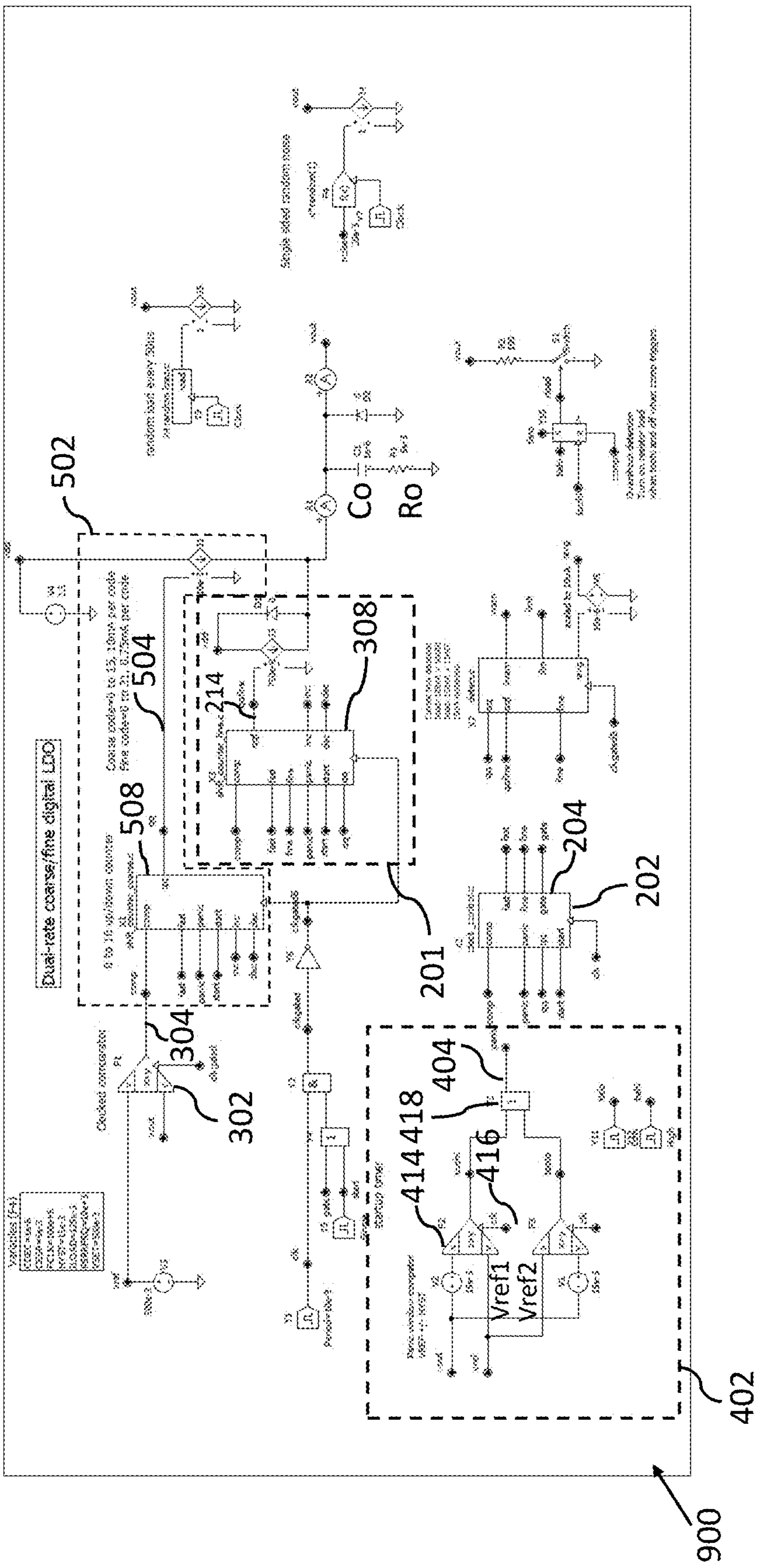
FIG. 9 is a schematic of a digital LDO in accordance with a tenth embodiment of the present disclosure.

FIG. 9 is a schematic of a digital LDO 900 in accordance with a tenth embodiment of the present disclosure.

Figure 10:
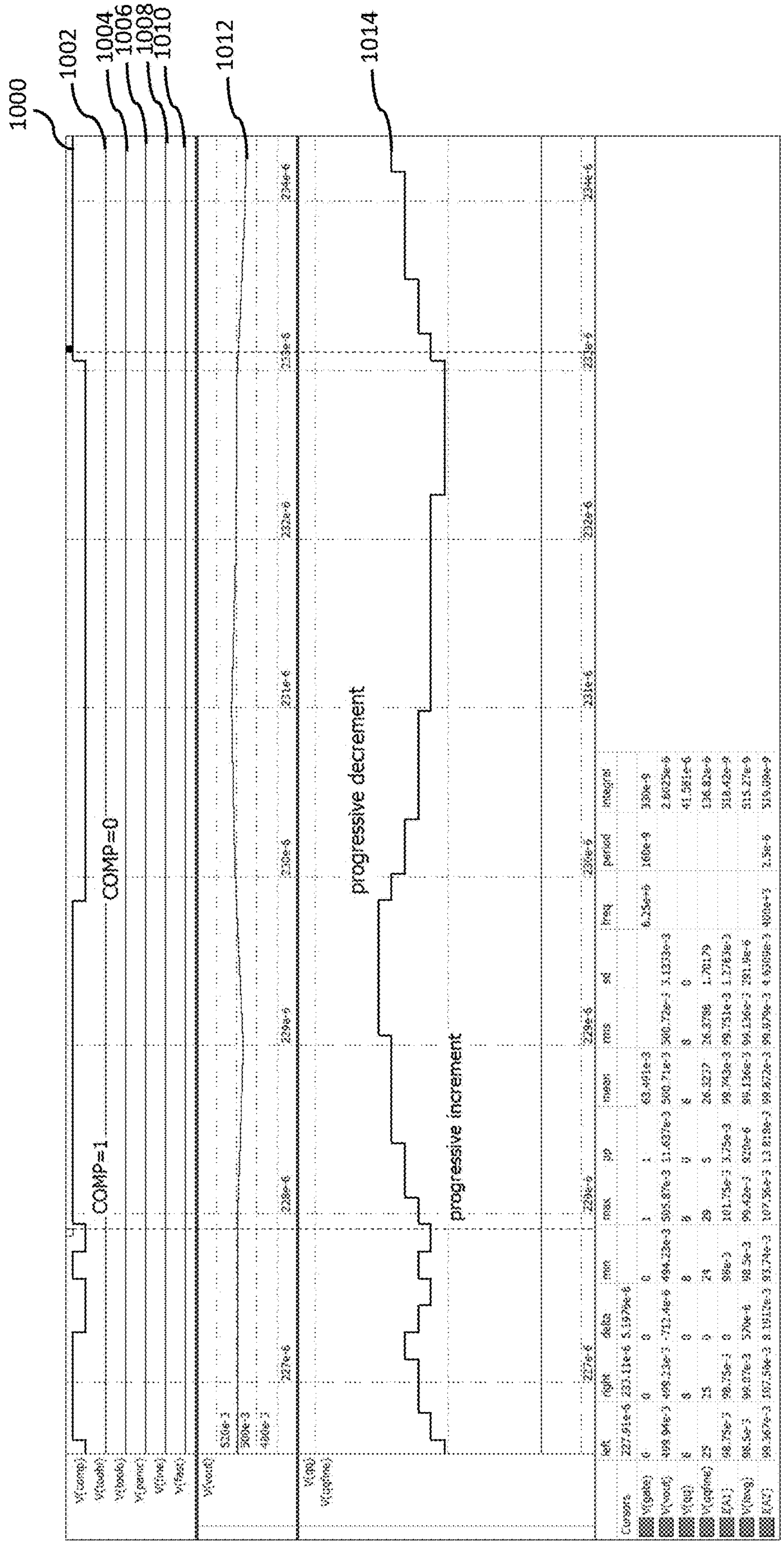
FIG. 10 is a timing graph showing simulation results for a practical implementation of the LDO of FIG. 9.

FIG. 10 is a timing graph showing simulation results for a practical implementation of the LDO 900 of FIG. 9. In FIG. 9 there is shown the error signal 304 (a trace 1000), the "toohi" signal (a trace 1002), the "toolo" signal (a trace 1004), the panic signal 404 (a trace 1006), the "fine" signal (a trace 1008), the "fast" signal (a trace 1010), the output voltage vout (a trace 1012) and the DAC code signal 214 (a trace 1014). In the simulation, a varying load was applied.

The waveform plot is zoomed into a region where the 'comp' signal (the trace 1000) is high then low for a relatively long time, and the respective increment and decrement of the 'qqfine' (the trace 1014) code shows the progressive lengthening of each step.

Embodiments of the present disclosure can lead to a reduction of the limit cycling of DAC codes as occurs with known digital LDOs. By using progressive time elongation of DAC code signals, as provided by embodiments of this disclosure, limit cycling is reduced.

Furthermore, embodiments of the present disclosure can reduce voltage ripple under steady state loads, and can be used to accommodate a wider spread in decoupling capacitors Co (both capacitance value and ESR value Ro)

Various improvements and modifications can be made to the above without departing from the scope of the disclosure.

The invention claimed is:

1. A digital low dropout regulator (LDO) for receiving a reference voltage and generating an output voltage, the digital LDO being synchronized to a clock signal and comprising:

a first digital to analog converter configured to:

generate a first DAC code signal, the output voltage being dependent the first DAC code signal;

trigger state transitions of the first DAC code signal between states, the state transitions comprising rising transitions and/or falling transitions;

trigger a first rising transition after n clock cycles, where n is a positive integer, and trigger a second rising transition after the first rising transition and after m clock cycles, where m is an integer and greater than n; and/or trigger a first falling transition after p clock cycles, where p is a positive integer, and trigger a second falling transition after the first falling transition and after q clock cycles, where q is an integer and greater than p.

2. The digital LDO of claim 1 comprising:

a comparison circuit configured to:

receive the reference voltage;

receive a feedback voltage, the feedback voltage being dependent on the output voltage;

compare the reference voltage and the feedback voltage; and generate an error signal that is dependent on the comparison between the reference voltage and the feedback voltage, wherein the first digital to analog converter is configured to:

receive the error signal; and generate the first DAC code signal based on the error signal.

3. The digital LDO of claim 2, wherein the first digital to analog converter comprises a first shift register configured to generate the first DAC code signal.

4. The digital LDO of claim 3, wherein the first shift register comprises an up-down counter.

5. The digital LDO of claim 3, wherein the first digital to analog converter comprises a plurality of first current sources, and each of the first current source functions as a bit of the first DAC code signal.

6. The digital LDO of claim 5, wherein each of the first current sources comprises a first transistor of a plurality of first transistors.

7. The digital LDO of claim 6, wherein the first shift register comprises a plurality of outputs, each output being associated with a single bit of the first DAC code signal and coupled to a gate of one of the plurality of first transistors.

8. The digital LDO of claim 7, wherein the first digital to analog converter comprises a plurality of first buffer circuits, each output being coupled to the gate of one of the plurality of first transistors via a buffer circuit.

9. The digital LDO of claim 8, each of the first buffer circuits comprises a first inverter.

10. The digital LDO of claim 9, comprising an output capacitor having an equivalent series resistance, the first DAC signal being provided to the output capacitor to generate the output voltage.

11. The digital LDO of claim 1, wherein n and p are equal and/or m and q are equal.

12. The digital LDO of claim 1, wherein the digital LDO comprises a second digital to analog converter configured to generate a second DAC code signal, the output voltage being dependent on the second DAC code signal.

13. The digital LDO of claim 12, wherein the first digital to analog converter is configured to provide fine control of the output voltage and the second digital to analog converter is configured to provide coarse control of the output voltage.

14. The digital LDO of claim 12, comprising:

a comparison circuit configured to:

receive the reference voltage;

receive a feedback voltage, the feedback voltage being dependent on the output voltage;

compare the reference voltage and the feedback voltage; and generate an error signal that is dependent on the comparison between the reference voltage and the feedback voltage, wherein the first digital to analog converter is configured to:

receive the error signal; and generate the first DAC code signal based on the error signal, and wherein the second digital to analog converter is configured to:

receive the error signal; and generate the second DAC code signal based on the error signal.

15. The digital LDO of claim 2, comprising a clock circuit configured to generate the clock signal.

16. The digital LDO of claim 15 comprising:

a panic circuit configured to:

detect when the feedback voltage exceeds a first threshold voltage value or falls below a second threshold voltage value; and control the first digital to analog converter to operate in a panic mode when the feedback voltage exceeds the first threshold voltage value or falls below the second threshold voltage value, wherein the clock circuit is configured to:

provide the clock signal to the comparison circuit;

operate in a fast mode during the panic mode by providing the clock signal at a first frequency; and operate in a slow mode, when not in the panic mode, by providing the clock signal at a second frequency, the second frequency being less than the first frequency.

17. A method of generating an output voltage using a digital LDO comprising a first digital to analog converter and synchronized to a clock signal comprising:

receiving a reference voltage at the digital LDO;

generating a first DAC code signal using the first digital to analog converter;

triggering state transitions of the first DAC code signal between states using the first digital to analog converter, the state transitions comprising rising transitions and/or falling transitions;

triggering a first rising transition after n clock cycles, where n is a positive integer, and triggering a second rising transition after the first rising transition and after m clock cycles, where m is an integer and greater than n; and/or triggering a first falling transition after p clock cycles, where p is a positive integer, and triggering a second falling transition after the first falling transition and after q clock cycles, where q is an integer and greater than p; and nverter; and generating the output voltage, the output voltage being dependent on the first DAC code signal.

* * * * *